US011190468B2

(12) United States Patent
Pottier

(10) Patent No.: US 11,190,468 B2
(45) Date of Patent: Nov. 30, 2021

(54) METHOD AND SYSTEM OF SYNCHRONIZING COMMUNICATIONS IN A COMMUNICATION ENVIRONMENT

(71) Applicant: MICROSOFT TECHNOLOGY LICENSING, LLC, Redmond, WA (US)

(72) Inventor: Marc Christopher Pottier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/389,847

(22) Filed: Apr. 19, 2019

(65) Prior Publication Data

US 2020/0336443 A1    Oct. 22, 2020

(51) Int. Cl.
*H04L 12/58* (2006.01)
*G06F 40/30* (2020.01)

(52) U.S. Cl.
CPC ............ *H04L 51/043* (2013.01); *G06F 40/30* (2020.01); *H04L 51/18* (2013.01); *H04L 51/22* (2013.01); *H04L 51/24* (2013.01); *H04L 51/34* (2013.01)

(58) Field of Classification Search
CPC ....... H04L 51/043; H04L 51/18; H04L 51/22; H04L 51/24; H04L 51/34; G06F 40/30
See application file for complete search history.

(56) References Cited

U.S. PATENT DOCUMENTS 6,968,052 B2 * 11/2005 Wullert, II ............ H04L 51/04
378/142.08
7,225,226 B2    5/2007 Fitzpatrick et al.
(Continued)

FOREIGN PATENT DOCUMENTS

EP    2830263 A1    1/2015

OTHER PUBLICATIONS

Avrahami, et al., "QnA: Augmenting an Instant Messaging Client to Balance User Responsiveness and Performance", In Proceedings of the ACM conference on Computer supported cooperative work, vol. 6, Issue 3, Nov. 6, 2004, pp. 515-518.
(Continued)

*Primary Examiner* — Rupal Dharia
*Assistant Examiner* — Steven C Nguyen
(74) *Attorney, Agent, or Firm* — NovoTechIP International PLLC

(57) ABSTRACT

Enabling synchronous communications between a message sender and recipient includes receiving a message from the sender via a user interface of a communication application or a service, the message being intended for the recipient; upon receiving the message, determining if the message includes a question and if so, determining if a response to the question is received from the recipient within a predetermined time; if the response is not received within the predetermined time, examining at least one of: a presence status indicator associated with the communication application, an activity indicator, a calendar, an out of office indicator, and a to do list to determine an availability of the sender to engage in a communication with the recipient via the communication application; and enabling display of a notification to the sender based on the determined presence of the sender, the notification including a reminder about the question.

17 Claims, 9 Drawing Sheets

(56) References Cited

U.S. PATENT DOCUMENTS

| | | |
|---|---|---|
| 7,319,882 B2 | 1/2008 | Mendiola et al. |
| 7,756,936 B2 | 7/2010 | Rosenberg et al. |
| 7,933,226 B2 | 4/2011 | Woodruff et al. |
| 8,423,392 B2 | 4/2013 | Moxley et al. |
| 8,560,567 B2 | 10/2013 | Perez Del Carpio et al. |
| 9,380,017 B2 | 6/2016 | Gelfenbeyn et al. |
| 9,686,087 B2 | 6/2017 | Chang et al. |
| 9,876,744 B2 | 1/2018 | Liu et al. |
| 9,959,355 B2 * | 5/2018 | Chitta ................... H04L 51/16 |
| 10,078,701 B2 | 9/2018 | Chitta et al. |
| 10,237,213 B2 | 3/2019 | Breedvelt-schouten et al. |
| 10,805,409 B1 * | 10/2020 | Ledet ................... G06F 21/604 |
| 2002/0085030 A1 | 7/2002 | Ghani et al. |
| 2003/0229722 A1 * | 12/2003 | Beyda ................... H04L 51/30 719/310 |
| 2004/0249890 A1 * | 12/2004 | Fellenstein ............ H04L 51/24 709/206 |
| 2005/0027708 A1 * | 2/2005 | Mueller ................ G06F 16/256 |
| 2006/0210034 A1 | 9/2006 | Beadle et al. |
| 2007/0061423 A1 | 3/2007 | Accapadi et al. |
| 2007/0067398 A1 * | 3/2007 | Karmarkar ............. H04L 67/18 709/206 |
| 2009/0106365 A1 * | 4/2009 | Drory .................. G06Q 10/107 709/206 |
| 2009/0307610 A1 * | 12/2009 | Ryan .................. H04L 12/1822 715/756 |
| 2012/0166242 A1 * | 6/2012 | Bentley ............ G06Q 10/06311 705/7.13 |
| 2012/0297322 A1 | 11/2012 | Malik |
| 2013/0179211 A1 * | 7/2013 | Murphy, Jr. et al. ........................ G06Q 10/1095 |
| 2014/0235282 A1 * | 8/2014 | Kansal .................. H04L 51/043 455/466 |
| 2014/0257903 A1 * | 9/2014 | Herscovici et al. ........................ G06Q 10/1095 |
| 2016/0308797 A1 | 10/2016 | Lu |
| 2017/0149865 A1 | 5/2017 | Banatwala et al. |
| 2018/0123986 A1 | 5/2018 | Faulkner et al. |
| 2018/0309708 A1 | 10/2018 | Potvin |
| 2019/0140996 A1 * | 5/2019 | Silberstein ............. G06N 20/00 |
| 2021/0051120 A1 | 2/2021 | Pottier et al. |

OTHER PUBLICATIONS

"How do I get a notification when a specific WhatsApp contact goes online on Android or iOS?", Retrieved from: https://www.quora.com/How-do-I-get-a-notification-when-a-specific-WhatsApp-contact-goes-online-on-Android-or-iOS, Jul. 10, 2019, 3 Pages.

Pal Juraj, "Address Your Team's Most Burning Questions in Slack with our New Integratio", Retrieved from: https://blog.sli.do/introducing-slido-for-slack/, May 24, 2018, 9 Pages.

"International Search Report and Written Opinion Issued in PCT Application No. PCT/US20/024362", dated May 25, 2020, 11 Pages.

"International Search Report and Written Opinion Issued in PCT Application No. PCT/US20/037682", dated Sep. 16, 2020, 14 Pages.

* cited by examiner

METHOD AND SYSTEM OF SYNCHRONIZING COMMUNICATIONS IN A COMMUNICATION ENVIRONMENT

TECHNICAL FIELD

This disclosure relates generally to interactions in a communication environment, and more particularly, to synchronizing exchange of messages in a communication environment.

BACKGROUND

In recent years, there has been a significant increase in the use of communication applications that enable a person to communicate with one or more other people in real-time. These applications include instant messaging, virtual conferencing, text messaging, and collaborative work environments, among others. The use of these applications enables participants to communicate with each other in real-time by using electronic devices, without the need to be in the same room at the same. With the significant increase in the use of such applications, the amount of information exchanged via these applications has also substantially increased. An average user may exchange hundreds of messages via one or more communication applications on a daily basis.

As part of communicating, participants may desire to send each other messages which may include one or more questions. If the intended recipient receives the message in a timely fashion and knows the answer to the question(s) asked, they may provide their response promptly. However, when the intended recipient does not receive the message immediately or does do not know the answer, given the number of messages exchanged, there is a chance that the receiver and/or sender may forget the unresolved conversation.

Hence, there is a need for an improved method and system of synchronizing exchange of messages in a communication environment.

SUMMARY

To address these issues and more, in one general aspect, the instant application describes a data processing system having a processor and a memory in communication with the processor where the memory stores executable instructions that, when executed by the processor, cause the data processing system to perform multiple functions. The function may include receiving a message from the sender via a user interface of a communication application or a service, where the message is intended for the recipient. Upon receiving the message, the method may determine via a processor, if the message includes a question. When the message includes a question, the method may determine via the processor, if a response to the question is received from the recipient within a predetermined time. After determining that the response is not received within the predetermined time, the method may examine at least one of: a presence status indicator associated with the sender provided by the communication application, an activity indicator, a calendar, an out of office indicator, and a to do list to determine an availability of the sender to engage in a communication with the recipient via the communication application. The method may then enable display of a notification to the sender based on the determined presence of the sender, the notification being displayed to the sender via a user interface element displayed on a sender's client device, where the notification includes a reminder about the question.

In yet another general aspect, the instant application describes a method for enabling synchronous communications between a sender and a recipient of a message. The method may include receiving a message from the sender via a user interface of a communication application or a service, where the message is intended for the recipient. Upon receiving the message, the method may determine via a processor, if the message includes a question. When the message includes a question, the method may determine via the processor, if a response to the question is received from the recipient within a predetermined time. After determining that the response is not received within the predetermined time, the method may examine at least one of: a presence status indicator associated with the sender provided by the communication application, an activity indicator, a calendar, an out of office indicator, and a to do list to determine an availability of the sender to engage in a communication with the recipient via the communication application. The method may then enable display of a notification to the sender based on the determined presence of the sender, the notification being displayed to the sender via a user interface element displayed on a sender's client device, where the notification includes a reminder about the question.

In a further general aspect, the instant application describes a non-transitory computer readable medium on which are stored instructions that when executed cause a programmable device to receive a message from the sender via a user interface of a communication application or a service, where the message is intended for the recipient. Upon receiving the message, the instructions may cause the programmable device to determine via a processor, if the message includes a question. When the message includes a question, the instructions may cause the programmable device to determine via the processor, if a response to the question is received from the recipient within a predetermined time. After determining that the response is not received within the predetermined time, the, the instructions may cause the programmable device to examine at least one of: a presence status indicator associated with the sender provided by the communication application, an activity indicator, a calendar, an out of office indicator, and a to do list to determine an availability of the sender to engage in a communication with the recipient via the communication application. The, the instructions may then cause the programmable device to enable display of a notification to the sender based on the determined presence of the sender, the notification being displayed to the sender via a user interface element displayed on a sender's client device, where the notification includes a reminder about the question.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
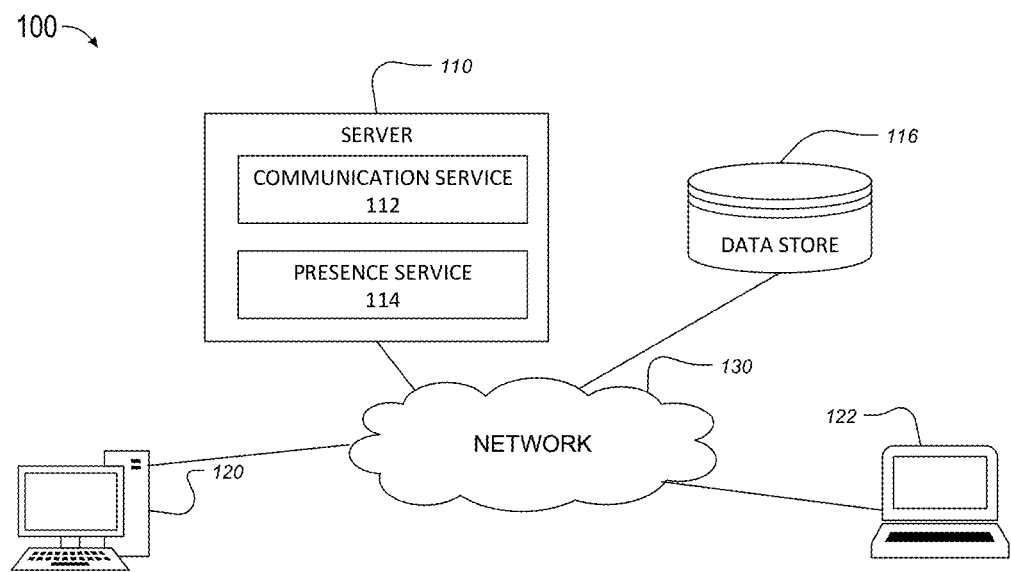
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

One limitation of existing electronic communication mechanisms is that the sender of a message containing a question does not have an efficient way of determining when to follow up with the recipient when a response is not received in a timely manner. Given the sheer number of electronic messages typical computer and mobile device users receive in any given day, it is likely that if the receiver does not see the message or respond to it right away, they may forget. In some cases, even the sender of the message may fail to recall that the question was not answered until a need for a response becomes imminent. Furthermore, the sender may not know when the best time is to follow up with the recipient to ensure that the recipient views and responds to the follow up message in a timely manner. For example, the sender may not wish to send repeated reminders when the recipient is away or is not using the communication application. Moreover, the question may require follow up or clarification to answer, and as such a real-time interaction may be beneficial to resolve the matter in a timely fashion. Even if the communication application provides an indication of when a user is available, determining the recipient's presence may require constant monitoring of the application by the sender. This may be time-consuming and inconvenient. Moreover, the status indicator may not always be accurate as the recipient may forget to change it. As a result, the process of ensuring a question is answered in a timely manner may prove to be time consuming and difficult. Thus, there is a need in the art for a method and system of enabling a sender and a receiver of a message that requires follow up to easily and efficiently synchronize their availability.

To address the issues discussed above and more, in an example, this description provides technology implemented for an improved method and system of determining when the sender and receiver of a message containing a question become available at the same time and notifying one or both parties of the other party's presence. To improve the current methods of communicating via a communication application or service, the improved method may monitor messages received via a communication application (e.g., instant messaging application, email application, VoIP application, etc.) to determine if the message contains a question. This may be achieved by utilizing one or more text analysis algorithms which may utilize machine learning algorithms. Once a message containing a question is detected, the communication application or service may determine if a response to the question is received from the recipient within a predetermined time. This may be done by monitoring the communication applications to determine if a message is sent from the recipient to the sender and/or analyzing the message to determine if it contains a response to the question. When a response is not detected as being received within a predetermined time, the communication application or service may monitor the intended recipient and the sender's presence, and notify the sender once the intended recipient becomes available during a time when the sender is also present. As a result, the solution provides an improved user experience for participants of a communication environment in an efficient manner.

As will be understood by persons of skill in the art upon reading this disclosure, benefits and advantages provided by such implementations can include, but are not limited to, a solution to the technical problems of users not being able to quickly and efficiently synchronize a time when two parties are available to finish a conversation which includes an on unanswered question. Technical solutions and implementations provided here optimize and improve the process of exchanging messages using an electronic communication mechanism. The benefits provided by these solutions include improving user experience, saving time and providing solutions for more efficient communications.

FIG. 1 illustrates an example system 100, upon which aspects of this disclosure may be implemented. The system 100 may include a sever 110 which may be connected to or include a data store 112 in which data relating to a communication mechanism such as a messaging application may be stored. The server 110 may be responsible for managing communications between various devices during communication sessions. For example, the server 110 may run an application, stored for example in the data store 112, that enables instant messaging between various participant devices. To do so, the server may receive signals from one or more of the participants and transfer those signals to other participants. The signals may be audio, video or other data signals. For example, the server may receive audio signals from a client device as part of a voice over internet protocol (VoIP) call and transmit those signals to a device indicated as the intended recipient of the VoIP call in a communication application. Video signals may be transferred during video-enabled virtual meetings to enable participants to see each other. Data signals may be transmitted to enable exchange of text messages and/or documents between participants.

The server 110 may operate as a shared resource server located at an enterprise accessible by various computer client devices such as client devices 120 and 122. Although shown as a single server, the server 110 may include multiple servers operating one or more communication applications that connect multiple users.

The server 110 may include and/or execute a communication service 112 such as an instant messaging service. Other examples of communication services may include email, VoIP calls, virtual meetings, voicemail services, or collaborative work environments. The communication service 112 may operate to enable exchange of messages between different users. For example, the communication service may manage distribution of messages created by clients in the network, track message histories and participants in conversations, and offer features providing controls for message participants. In one implementation, the server may provide a cloud-based communication service such as an online instant messaging application operating via the network 130. The network 130 may be a wired or wireless network(s) or a combination of wired and wireless networks that connect one or more elements of the system 100.

The server 110 may also include and/or execute a presence service 114. A presence service may permit each user to see whether other users in a user-specified set of contacts (commonly known as a contact list, buddy list or friend list) are currently available for exchanging communications. The presence information for each user may be gathered via a presence status indicator among other factors. The presence status indicator may be a user selectable indicator which provides options such as: available, busy, idle, do not disturb, or out to lunch, which may be displayed by communication applications. The communication applications may enable the user to select one of the presence status indicators to specify their availability. Other factors may also be monitored and taken into account to determine a user's availability. Once availably is determined and/or updated, presence information may be sent by a client to the presence service 114 which may in turn send the information to users who have elected to receive them for a specified set of contacts. This may be done by way of a server, such as server 110 via the communication service 112. Specifically, the report regarding changed status may be sent to the communication service 112, which may in turn report the changed availability by sending a presence update to all connected users who have elected to receive such updates regarding that contact. As such, the presence service 114 may function or be integrated with the communication service 112. Furthermore, when the communication service 112 is used to provide an online messaging service, the presence service 114 may function as a client presence agent to determine the user's presence status. Although shown as one service, the presence service is representative of one or more presence services associated with one or more applications. For example, when multiple applications are used by an overlapping group of users, presence information may be collected and shared between presence services associated with each application.

The system 100 may also include a sender client device 120 and a recipient client device 122, each of which may be connected via the network 130 to the server 110. Each of the client devices 120 and 122 may include or have access to a communication application which functions with the communication service 112 to enable users of each device to participate in communication sessions such as messaging sessions. It should be noted that although client device 120 is labeled as a sender device and client device is 122 is labeled as the recipient device, each of the client devices 120 and 122 may become a sender or a receiver during a communication session.

The client devices 120 and 122 may be any type of device that can communicate with the network, such as, personal or handheld computing devices having or being connected to both input and output elements. For example, client devices 120 and 122 may be one of: a mobile telephone; a smart phone; a tablet; a phablet; a smart watch; a wearable computer; a personal computer; a desktop computer; a laptop computer; a gaming device/computer; a television; a thick client; a thin client; a browser-based client; an application executing on a device; an embedded widget operating on a device and the like. This list is for example purposes only and should not be considered as limiting.

Figure 2:
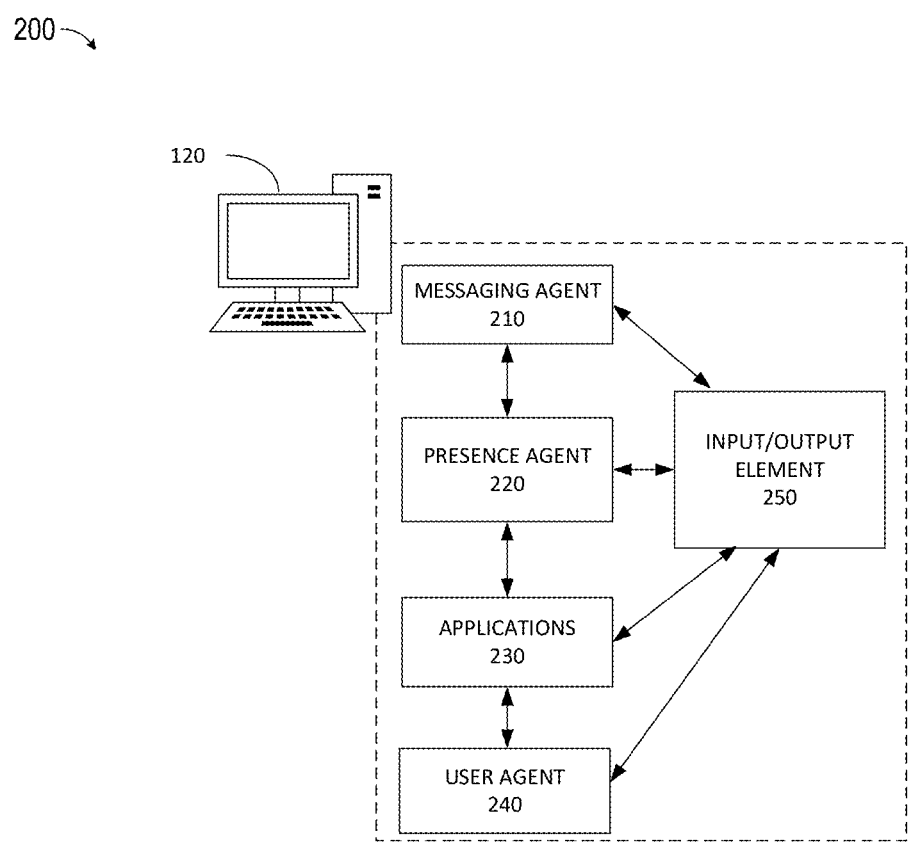
FIG. 2 depicts an example client device upon which aspects of this disclosure may be implemented.

FIG. 2 depicts an example client device 120 upon which aspects of this disclosure may be implemented. In one implementation, client device 120 may include a messaging agent 210, a presence agent 220, one or more applications 230, and a user agent 240 each in communications with an input/output element 250. Each application 230 may be a computer program executed on the client device that configures the device to be responsive to user input to allow a user to communicate with another user. The application may send, receive, and make data (including documents and audio/video data) available by for example displaying the data on an output element of the client device. Examples of suitable applications include, but are not limited to, an email application, an instant messaging application, a collaborative work application, a conferencing application, a VoIP application, and a voicemail application.

In some examples, applications 230 may include online applications that are run on the server 110 and provided via an online service as described above. In one implementation, web applications may communicate via the network 130 with the user agent 240, which for example may be a browser executing on the client device 120. The user agent 240 may provide a user interface (UI) that allows the user to interact with the application and exchange messages with various other users. The UI may be displayed on a display device of the client device 120 by utilizing for example the user agent 240. In some examples, the user agent 240 may be a dedicated client application that provides a UI and access to electronic communications which may be stored in the data store 112. In other examples, communication applications used to communicate with other users may be local applications such as the applications 230 that are stored and executed on the client device 120 and provide a UI that allows the user to interact with application.

The applications 230 may be in communications with or may include one or more messaging agents such as messaging agent 210. The messaging agent 210 may enable communication with the communication service 112 to for example facilitate a messaging session. It should be noted that the client device may include other types of agents which may facilitate other types of communications. The messaging agent 210 may be in communication with a presence agent 220 which may function to determine the presence of the user and/or periodically query the presence service 114 to access one or more current presence indicators for each participant included in a list of participants identified in the one or more applications 230.

In one implementation, the presence agent 220 may collect information from one or more applications of the client device including the applications 230 and the messaging agent 210 to determine the presence of the user. The information collected may include the presence status indicator from one or more communications applications. As discussed above, the presence status indicator may be used by the application to indicate the availability of the user and each user-specified contact in a list of contacts. In addition to the presence status indicator, the presence agent 220 may collect other information indicative of the user's availability.

For example, the presence agent 220 may make use of detectors provided by one or more applications available via the client device to detect the user's current status and activity. The information collected may come from the user's calendar (e.g., indicating the user is in a meeting), to-do list, virtual conferencing application (e.g., indicating an on-going conference), a presentation application (e.g., indicating the user is presenting a document), a work-related application (e.g., a word processing document indicating the user is preparing a document, a programming mode showing the user is interacting with a programming software interface), a VoIP application, and the like. For a mobile client device such as a mobile phone, this information may include whether the user is on a cellular call, whether they are driving (e.g., using a GPS application), and the like. All of this availability related information may be collected, aggregated and examined by the presence agent 220 and/or the messaging agent 210 to determine the user's current availability status. The additional information may be need because sometimes the user may indicate, using a presence status indicator of a communications application such as in instant messaging application, that the user is available and forget to change the status once they begin a different task. By collecting and examining information from multiple different applications, the presence agent may ensure that the user is actually available to engage in a communication. When the presence agent 220 detects that the availability of the user has changed, it may automatically report the changed availability to the presence service 114 which may forward the information to other users.

In addition to detecting and reporting the user's availability, the presence agent 220 may also receive presence updates for other users from the presence agent 114. These presence updates may be stored in a databased and displayed to the user via one or more communication applications for user-specified contacts in a list of contacts for display.

The input/output element 250 may be used to display one or more UIs associated with applications 230 and to receive inputs from the user which may be used to engage in communication or update the presence status. The internal hardware structure of a client device is discussed in greater detail in regard to FIGS. 6 and 7.

Figure 3A:
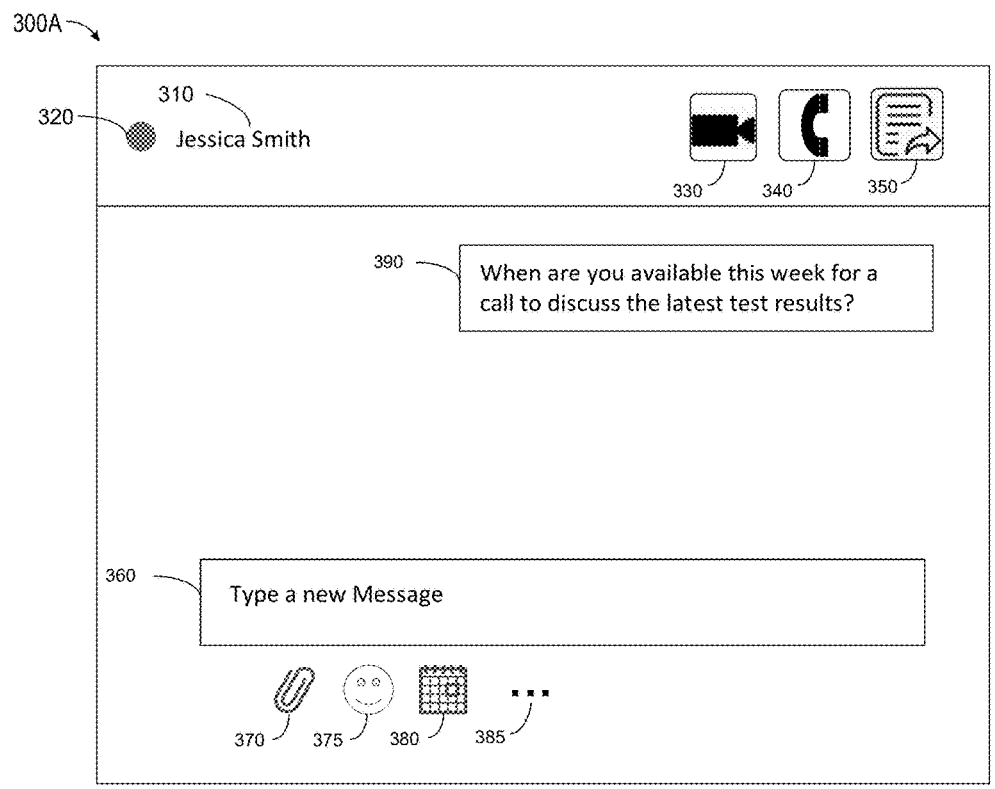
FIGS. 3A-3B depict various example user interfaces which may be presented to a participant during a communication session.
Figure 3B:
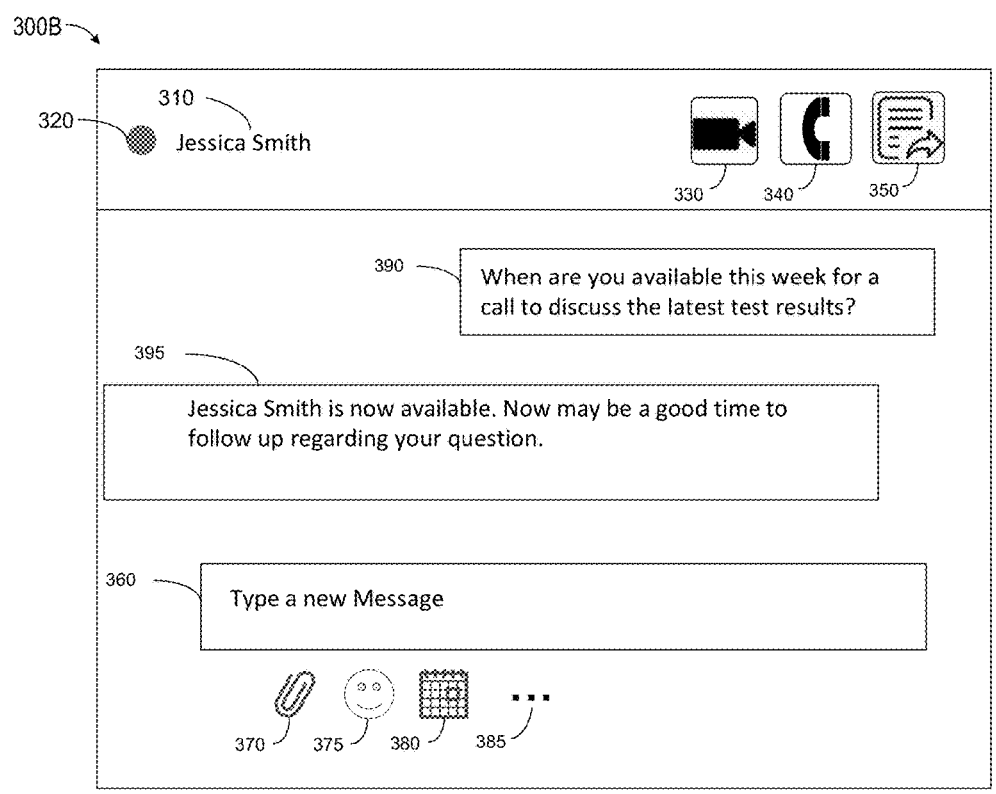

FIGS. 3A-3B illustrates an example UI screen which may be presented to a participant during a communication session, such as an instant messaging session. The UI screen 300A of FIG. 3A may for example be indicative of a messaging session between the user and a contact named Jessica Smith. In one implementation, the UI screen 300A is displayed by the messaging application running on the user's client device. Alternatively, the UI screen 300A may be shown via an online messaging service.

The UI screen 300A may include a UI element 310 for displaying the name of the contact with which the user has started a messaging session, and a contact presence status indicator 320 for displaying the presence status of the contact shown by the UI element 310. In the example shown in UI screen 300A, the presence indicator 320 displays a circle which may be indicative of the contact being busy. Other presence statuses may include: available, unavailable, do not disturb, idle, out to lunch, be right back, and others. In one implementation, a default status (e.g., available) may be selected by the messaging application when it is first opened. The default status may be changeable at any time by the user, for example, by utilizing a UI menu of the messaging application/service. Once a change in the status is detected (e.g., the user first opens the application and the status changes from unavailable to available), the updated status may be sent to all client devices (or users utilizing an online messaging service) which have included the contact in their list of contacts. As a result, when a user such as the user of UI screen 300A chooses to begin a messaging session with a contact, the contact's presence status may be displayed by the presence status indicator 320. It should be noted that this presence status indicator may be different from the availability determination made by the user's presence agent. As discussed above, that determination may include taking into account other factors in addition to the presence indicator.

The UI screen 300A may also include a menu button 330 for engaging in a video conference with the contact, a call button 340 for initiating a VoIP audio call with the contact, and a share screen button 350 for beginning to share a screen with the contact. Thus, although UI screen 300A displays an instant messaging scenario, the same communication application may be used to engage in instant messaging, video conferencing, VOIP calling, and sharing of a screen with a contact. In this manner, information about a user's activity may easily be collected from one communication application to detect the user's availability. Furthermore, unresolved communications may be detected and tracked from various communication channels, as discussed further below.

The UI screen 300A may also include an input box 360 for entering contents to be shared with the contact. In this manner, the user of the UI screen 300A may enter a text in the input box 360 to send as an instant message to the contact identified by UI element 310. In addition to entering text into the input box 360, the user may utilize other menu options such as a menu button 370 for attaching a file or menu button 375 for entering an emoticon into the input box 360. The UI screen 300A may also include a menu button 380 for scheduling a virtual conference with the contact, and a menu button 385 which may display a context menu providing other options such as sending a video message, sending a contact, creating a poll, and others.

Upon entering input into the input box 360 and pressing enter or clicking on a share button (not shown), the entered text may be instantly transmitted to the contact. If the contact has their corresponding communication application (or online communication service) open, the message may be immediately transferred to and/or displayed on the UI of the contact's communication application/service. However, if the contact does not have their application or service open (e.g., their computer is not turned on or the application is not open), the message may be stored in a database associated with the communication application/service to be displayed the next time the contact opens the communication application/service. At the same time, the message may be displayed within the UI screen 300A of the user as a sent message in a UI element such as element 390. To provide better means of synchronizing users' exchange of information, the message sent via the UI screen 300A may be examined to determine if it contains a question. This may be done via one or more text analysis algorithms discussed in more detail below.

When it is determined that the message includes a question, the communication application or service may begin tracking the amount of time that passes before a response to the message is received. This may be done by initializing a timer, once the determination is made. The timer may be operated by the communication application of the sender or the messaging service of the server. Once the amount of time passed surpasses a predetermined threshold (e.g., two hours has passed since the sender sent a message containing a question) and a response is not detected as being received, the communication application of the sender or the messaging service of the server may send a request to the presence agent of the recipient (or the presence service of the server, as the case may be) to provide a notification once the recipient becomes available.

When the recipient is identified as being available and a notification is sent via the server to the communication application of the sender, the presence agent of the sender (or the presence service of the server, as the case may be) may determine if the sender is now available. When the sender is determined as being available, a notification may be presented to the sender to notify them of the presence of the recipient and remind them of the unanswered question. This may be done by displaying a pop-up UI element, such as UI element 395 of FIG. 3B. Other methods of presenting the notification and reminder are also contemplated. For example, although FIG. 3B depicts UI screen 300B of the messaging session between the sender and the contact, the notification may be presented to the user on any other UI screen of the communication application/service. This may be necessitated for example when the sender closes the messaging session between the sender and the recipient, opens a messaging session with a different contact, begins another form of communication with a contact, or moves to a different UI screen of the communication application for any reason. In one implementation, the notification may be presented to the user, even if the user is currently viewing a screen of a different application. For example, the notification may be presented as a task bar menu notification.

Figure 4A:
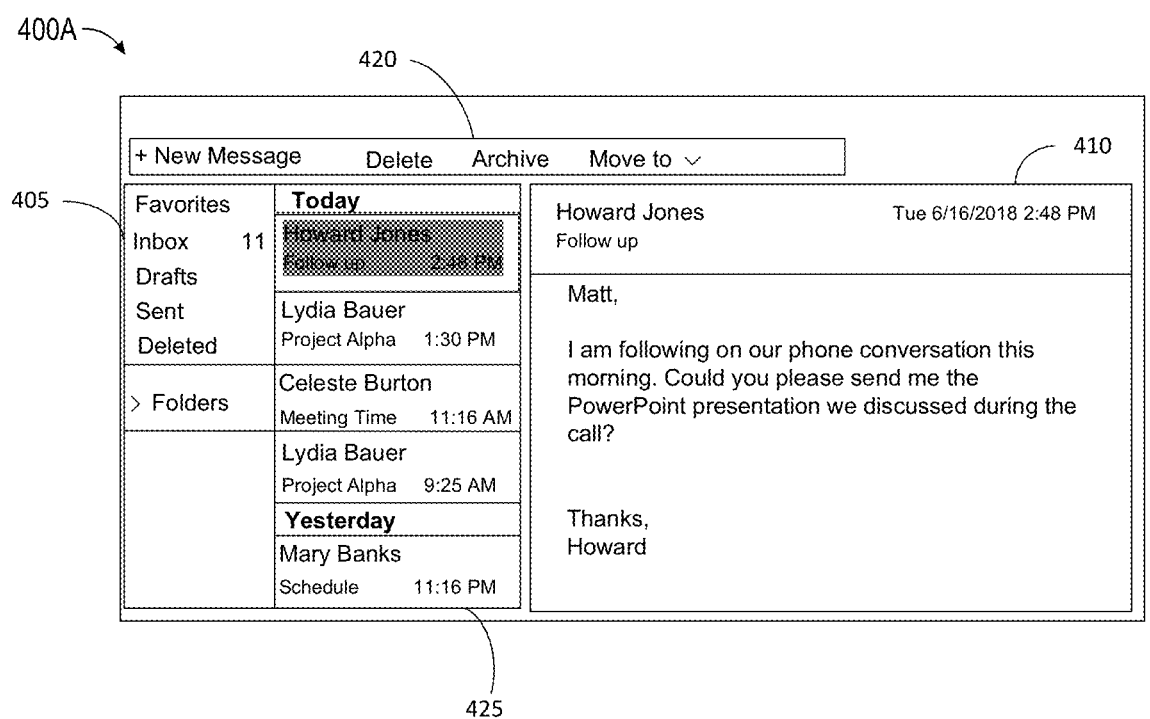
FIGS. 4A-4B depict example user interface screens which may be presented to a participant utilizing an email communication application.
Figure 4B:
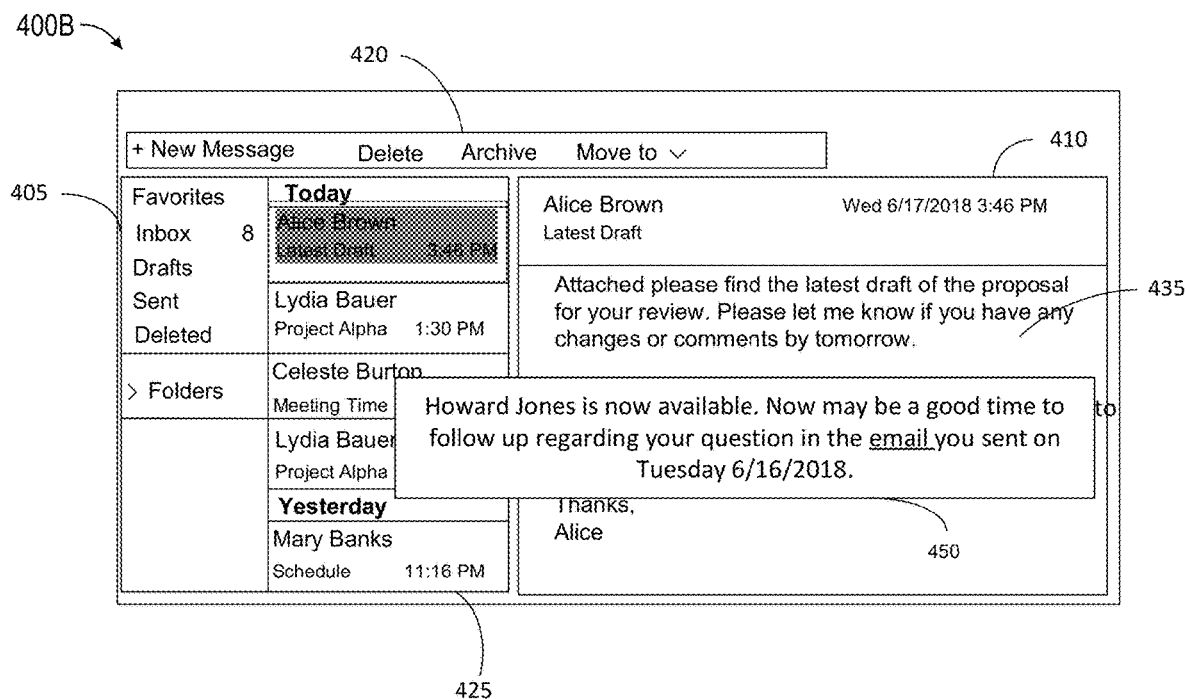

FIGS. 4A-4B illustrate example UI screens which may be presented to a participant utilizing an email communication application. The UI screens of FIGS. 4A-4B may include a mailbox menu pane 405 which contains links for accessing different folders in the mailbox and a summary email pane 425 containing a list of emails with certain identifying information such as the senders, titles and date/time of the emails. The email selected from the summary email pane 425 is highlighted (i.e., has a gray background) to indicate that this is the email shown in the email pane 410. The UI screens 400A and 400B may also include a tool bar 420 containing various links for tools to use for composing a new email message or functions to perform with the selected email.

To ensure synchronicity between a sender and a receiver of an email requiring follow up, the email communication application may examine the contents, context and/or other parameters of an email sent/received to determine if the email contains a question and as such requires a follow up. To do so first the contents of the email may be examined using one or more text analysis algorithms to determine if the email includes a question. Subsequently, other parameters may be examined to determine if the email requires a follow up. For example, in order to prevent the users from receiving numerous notifications, in addition to merely checking contents of emails, the application/service may also examine other parameters such as whether any keywords indicating urgency (e.g., urgent, asap) are included, whether a flag indicating high importance is assigned to the email and/or whether the sender and/or the receiver has marked the email as requiring follow up. In one implementation, an option may be made available to users to select for each email message to indicate that the email message requires follow up notification. Once the email communication application/service determines that an email contains a question and requires follow up, it may begin determining if a response to the email is received within a predetermined time. This may be done by utilizing a timer that measure the amount of time passed before a response to the email is received. The timer may be operated by the communication application of the sender or the messaging service of the server. Once the amount of time passed surpasses a predetermined threshold (e.g., 24 hours has passed since the sender sent a message containing a question and requiring follow up) and a response is not detected as being received, the email communication application of the sender or the server may send a request to the presence agent of the recipient (or the presence service of the server, as the case may be) to provide a notification once the recipient becomes available.

In one implementation, a user has to have agreed to share their availability with other users before notification could be provided. This may require the communication application to seek permissions from users before any availability information is shared with others. In one implementation, the communication application may provide an option for users to select which contacts or which group of contacts they wish their share their availability with.

When the recipient is identified as being available and a notification is sent to the communication application of the sender or the server, the presence agent of the sender (or the presence service of the server, as the case may be) may determine if the sender is now available (e.g., their email application is open, they are currently using the email application, and/or a presence status indicator indicates availability). When the sender is determined as being available, a notification may be presented to the sender to notify them of the presence of the recipient and remind them of the unanswered question. This may be done via displaying a pop-up UI element, such as UI element 450 of FIG. 4B, which depicts a UI screen 400B of the email communication application/service displayed for the sender of the email in UI screen 400A. Thus, the sender of the email containing a question and/or requiring follow up may be presented with a notification. The UI element 450 may include a notification that the receiver is available in addition to a reminder of the email containing the question. In one example, the reminder may include information about the email and a link to the email upon selection of which the sent email may be directly accessed.

Other methods of presenting a notification and reminder are also contemplated. For example, although FIG. 4B depicts UI screen 400B of the email communication application, the notification may be presented to the user on any other UI screen being currently displayed to the user. In one implementation, the notification may be presented to the user, even if the user is currently viewing a screen of a different application. For example, the notification may be presented as a task bar menu notification.

Figure 5:
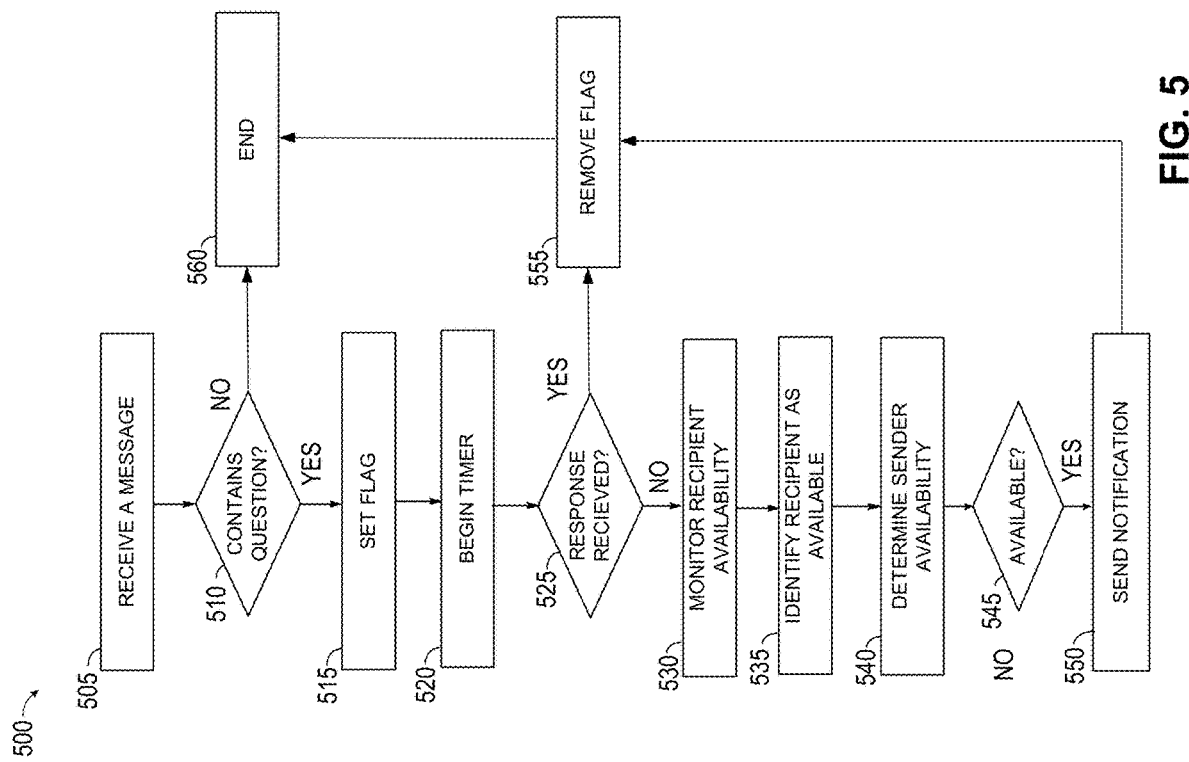
FIG. 5 is a flow diagram showing an example method for notifying the sender and/or receiver of an unanswered message containing a question when the both parties become available at the same time.

FIG. 5 is a flow diagram depicting an example method 500 for notifying the sender and/or receiver of an unanswered message containing a question when the both parties become available at the same time. At 505, method 500 may begin by receiving a request from a sender (e.g. a client device connected to a server via a communication application or a UI of a client device utilizing an online communication service) to send a massage to a recipient. The message may be an instant message containing text, emoticons, and/or other characters. The message may also be an email message, a voice-message, a video-message and/or a combination of one or more types of messages. The message may be received as an input from the user via a UI displayed on the sender's client device or received as audio/video from an input device in communication with the sender's client device. Once the message is received, the server may transmit the message to the recipient's client device or otherwise make the message available to the recipient via an online service.

The server and/or the recipient's client device (e.g., the local communication application of the recipient client device) may then examine the message to determine if it contains a question, at 510. For messages that are not already in a text format (e.g., audio and/or video messages), this may involve first utilizing a voice-recognition algorithm to convert the audio in the message to text before the contents can be examined. Once the message is in a text format, one or more text analysis or natural language processing (NLP) algorithms may be utilized to examine the contents, context, formatting and/or other parameters of the text to determine if the message includes a question.

When method 500 determines that the message does not contain a question, it may proceed to step 560 to end. When, however, it is determined at 510, that the message contains a question, method 500 may set a flag for the message, at 515. This may be done by the server, the recipient client device and/or the sender client device. The flag may indicate that the message needs to have a follow up action, namely that a response to the message should be tracked. The process of setting a flag for the message may include storing the message or information relating to the message in a database associated with the messaging session.

Method 500 may then proceed to begin a timer, at 520, to start measuring the amount of time passed since the question was asked (e.g., since the message was sent). The timer may operate as part of the recipient's communication application, or as part of the communication service provided by the server. Alternatively, the server and/or the recipient's client device may send a message to the sender's communication application to request that the sender's client device initialize a timer to begin tracking the amount of time passed before a response is received.

After the timer is set, method 500 may proceed to determine if a response to the question is received within a predetermined amount of time, at 525. The predetermined amount of time may be preset by the application and may vary depending on the type of message received. For example, for instant messages, the predetermined amount of time may be set at 2 hours, while for email message it may be set at 24 hours. That is because, in general, instant messages are generally exchanged at a faster rate than email messages. In one implementation, the amount of time may be variable and/or could be set by the user.

Determining whether a response to the question was received, may simply involve examining to see if a message was sent from the recipient to the sender. Alternatively, the process may also include utilizing one or more text analysis algorithms to examine the contents, context, formatting and/or other parameters of the message to determine if it relates to the question asked and/or it is a response. The process of determining whether a response was received may be performed by the recipient client device (e.g., by determining if a user input was received in the messaging session), by the server (e.g., by identifying if a message was received from the recipient's client device), and/or by the sender client device (e.g., by determining if a message originating from the recipient was received from the server).

When it is determined, at 525, that a response was received within the predetermined time, method 500 may proceed to remove the flag, at 555. This may be because, once a message is received within the predetermined time frame, no further monitoring or action may be required for the message. Thus, the flag may be removed from the database at which it was stored. Alternatively, the database may be updated to indicate that the flag was resolved.

Referring back to step 525, when it is determined that a response was not received within the predetermined time frame, that is the amount of time measured by the time exceeds the predetermined amount of time and yet no response has been received, method 500 may proceed to monitor the recipient's availability, at 530. This may be achieved by examining a presence status indicator of the communication application used to receive the message. As discussed above, the presence status indicator may be set by the user to indicate an availability status the user desires to share with his/her contacts. As a result, the presence status indicator may be a good determining factor for whether the user is able or willing to participate in an exchange of messages with a contact. However, the presence status indicator by itself may not always be accurate. For example, if the presence status indicator is set as available but the recipient is engaged in a different messaging session or an audio or video conference, the recipient may not be available to participate in an exchange of messages with the sender. Thus, other availability factors may also be taken into account. These may include examining activity indicators which signal the user's use of other communication mechanisms of the communication application or the user's active use of other applications. Additional factors such as the user's calendar, to do list and others may also be examined and considered for determining availability. These factors may be examined and aggregated by the recipient's client device or the server (which may receive signals relating to the factors from the recipient's client device) continuously until the recipient is identified as being available, at 535. Alternatively, the factors may be examined based on a scheduled recurrent basis (e.g., every 10 minutes) until the recipient is identified as being available.

Once the recipient is identified as being available, method 500 may proceed to determine if the sender is available, at 540. This may be done, by sending a request to the sender's client device to determine the sender's availability status. This is because in order to ensure synchronicity between the sender and the receiver, a notification should be sent once both parties are available at the same time. Otherwise, if a notification is sent to the sender when the sender is not available, by the time the sender becomes aware of the notification, the recipient may have become unavailable again.

Upon receiving the request to determine the sender's availability, the sender's client device (or the server as the case may be) may utilize the sender's presence status indicator and/or other factors discussed above to determine the sender's availability. Method 500 may then proceed to determine, at 545, if the sender is available to engage in communication with the recipient. If the sender is not identified as being available, method 500 may return to step 530 to again monitor the recipient's availability and find the next window when the recipient may become available. This may involve sending a signal from the recipient's client device to the server to indicate unavailability. When, however, the sender is identified as being available, method 500 may proceed to send a notification, at 550. The notification may be sent to the sender by being displaying on the sender's client device. In some examples, the notification may include a reminder and/or a link to the question. In one implementation, a notification may also be sent to the receiver. Once the notification(s) is sent, method 500 may proceed to step 555 to remove the flag and continue to end at step 560.

Thus, in different implementations, an improved method and system may be provided to enable synchronous follow up interactions between a sender and a receiver of a message containing a question. To enable efficient exchange of messages, a message sent via a communication application may be examined to determine if it includes a question. Upon identifying a question, the availability of the recipient and the sender may be monitored to find a window of time when both parties become available at the same time. Once both the sender and the recipient are identified as being available, a notification may be sent to one or both parties to enable further exchange of messages during a convenient time.

Figure 6:
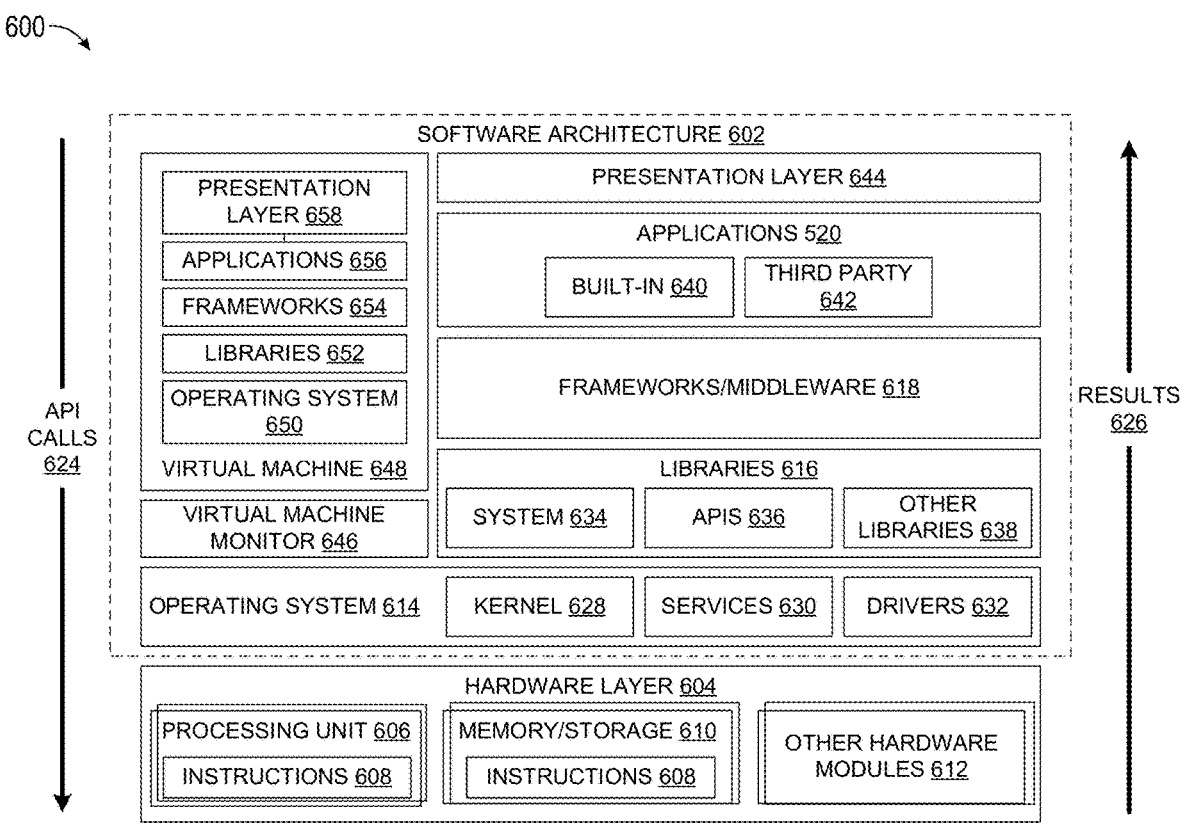
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 624. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 620 and/or third-party applications 622. Examples of built-in applications 620 may include, but are not limited to, a contacts application, a browser application, a location application, a media application, a messaging application, and/or a game application. Third-party applications 622 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 626 which manages operation of the virtual machine 628 and interoperation with the host operating system. A software architecture, which may be different from software architecture 602 outside of the virtual machine, executes within the virtual machine 628 such as an OS 650, libraries 652, frameworks 654, applications 656, and/or a presentation layer 658.

Figure 7:
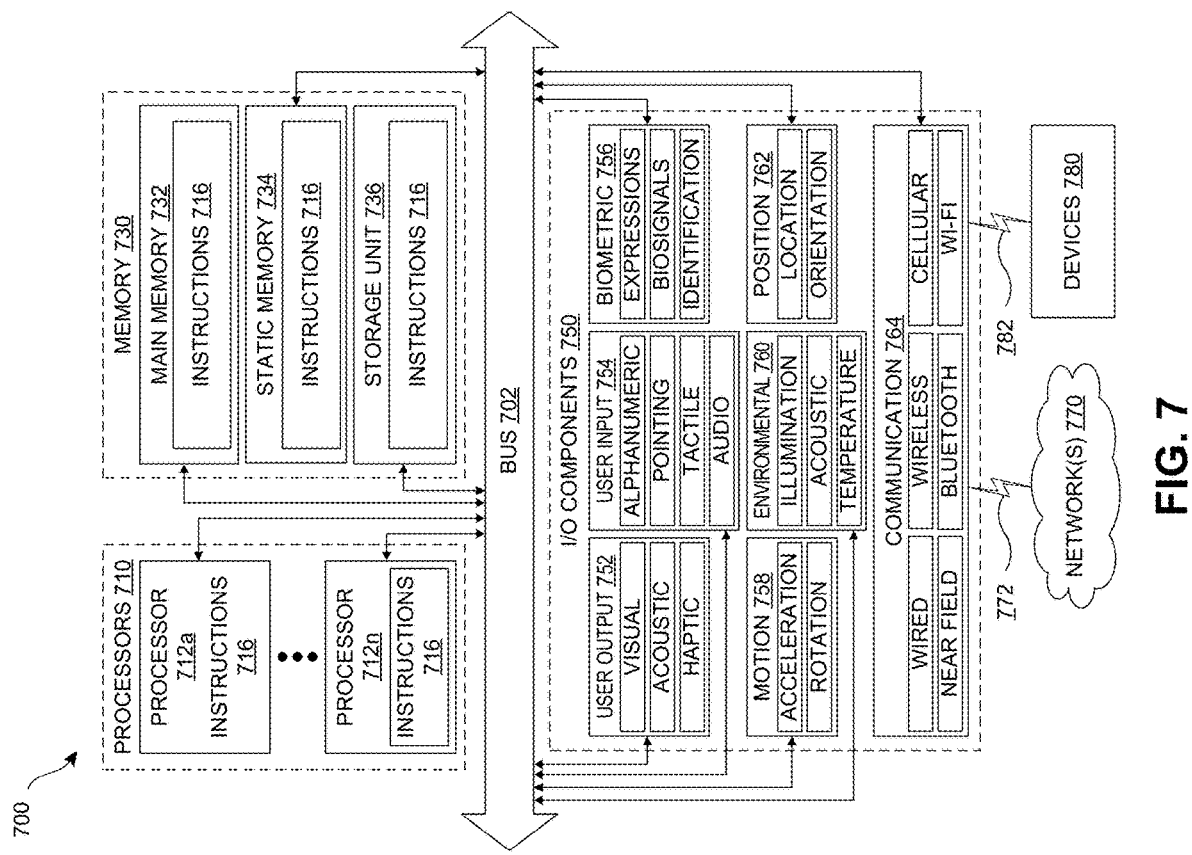
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory storing executable instructions that, when executed by the processor, cause the data processing system to perform functions of:

receiving, via a communication network, a message sent from a sender to a recipient, the message being received from the sender via a user interface of a communication application operating at a sender device or a communication service accessible to the sender;

determining that the message includes a question;

responsive to determining that the message includes a question, determining whether a response to the question has been received from the recipient within a predetermined time;

in response to determining that the response has not been received within the predetermined time, determining an availability of the sender and recipient, wherein the availability of the sender is determined by examining at least one of a presence status indicator associated with the sender provided by the communication application, an activity indicator, a calendar, an out of office indicator, and a to do list; and in response to determining that both the sender and recipient are currently available simultaneously, causing the sender device to display a notification including a reminder about the question in the message sent to the recipient.

2. The data processing system of claim 1, wherein, for determining that the message includes the question, the executable instructions, when executed by the processor, further cause the processor to control the data processing system to perform a function of analyzing contents of the message via a text analysis algorithm.

3. The data processing system of claim 1, wherein, for determining whether a response to the question has been received from the recipient within the predetermined time, the executable instructions, when executed by the processor, further cause the processor to control the data processing system to perform functions of:

monitoring exchange of one or more messages between the sender and the recipient; and determining, based on the exchange, whether a recipient-initiated message is sent from the recipient to the sender within the predetermined time.

4. The data processing system of claim 1, wherein the executable instructions, when executed by the processor, further cause the data processing system to perform functions of causing, in response to determining that the sender and recipient are both available simultaneously, a recipient device associated with the recipient to display another notification related to the question in the message sent to the recipient.

5. The data processing system of claim 1, wherein the executable instructions, when executed by the processor, further cause the data processing system to perform a function of determining, prior to determining the availability of the sender and upon determining that the response has not been received within the predetermined time, whether the sender has been offline or logged off subsequent to sending the question and before the response to the question has been received.

6. The data processing system of claim 1, wherein the message comprises at least one of an instant message, a voice message, a video message and an email message.

7. A method of operating a data processing system for enabling synchronous communications between a sender and a recipient of a message, the method comprising:

receiving, via a communication network, the message sent from the sender to a recipient, the message being received from the sender via a user interface of a communication application operating at a sender device or a service accessible to the sender;

determining that the message includes a question;

responsive to determining that the message includes a question, determining whether a response to the question has been received from the recipient within a predetermined time;

in response to determining that the response has not been received within the predetermined time, determining an availability of the sender and recipient, wherein the availability of the sender is determined by examining at least one of a presence status indicator associated with the sender provided by the communication application, an activity indicator, a calendar, an out of office indicator, and a to do list; and in response to determining that both the sender and recipient are currently available simultaneously, causing the sender device to display a notification including a reminder about the question in the message sent to the recipient.

8. The method of claim 7, wherein determining that the message includes the question comprises analyzing contents of the message via a text analysis algorithm.

9. The method of claim 7, wherein determining whether a response to the question has been received from the recipient within the predetermined time comprises:

monitoring exchange of one or more messages between the sender and the recipient; and determining, based on the exchange, whether a recipient-initiated message is sent from the recipient to the sender within the predetermined time.

10. The method of claim 7, further comprising determining, prior to determining the availability of the sender and upon determining that the response has not been received within the predetermined time, whether the sender has been offline or logged off subsequent to sending the question and before the response to the question has been received.

11. The method of claim 7, wherein the message comprises at least one of an instant message, a voice message, a video message and an email message.

12. The method of claim 7, further comprising causing, in response to determining that the sender and recipient are both available simultaneously, a recipient device associated with the recipient to display another notification related to the question in the message sent to the recipient.

13. A non-transitory computer readable medium containing executable instructions that, when executed by a processor cause a computer to perform functions of:

receiving, via a communication network, a message sent from a sender to a recipient, the message being received from the sender via a user interface of a communication application operating at a sender device or a service accessible to the sender;

determining that the message includes a question;

responsive to determining that the message includes a question, determining whether a response to the question has been s received from the recipient within a predetermined time;

in response to determining that the response has not been received within the predetermined time, determining an availability of the sender and recipient, wherein the availability of the sender is determined by examining at least one of: a presence status indicator associated with the communication application, an activity indicator, a calendar, an out of office indicator, and a to do list; and in response to determining that both the sender and recipient are currently available simultaneously, causing the sender device to display a notification including a reminder about the question in the message sent to the recipient.

14. The non-transitory computer readable medium of claim 13, wherein, for determining that the message includes the question, the executable instructions, when executed by the processor, further cause the processor to control the computer to perform a function of analyzing contents of the message via a text analysis algorithm.

15. The non-transitory computer readable medium of claim 13, wherein, for determining whether a response to the question has been received from the recipient within the predetermined time, the executable instructions, when executed by the processor, further cause the processor to control the computer to perform functions of:

monitoring exchange of one or more messages between the sender and the recipient; and determining, based on the exchange, whether a recipient-initiated message is sent from the recipient to the sender within the predetermined time.

16. The non-transitory computer readable medium of claim 13, wherein the executable instructions, when executed by the processor, further cause the computer to perform a function of causing, in response to determining that the sender and recipient are both available simultaneously, causing a recipient device associated with the recipient to display another notification related to the question in the message sent to the recipient.

17. The non-transitory computer readable medium of claim 13, wherein the message comprises at least one of an instant message, a voice message, a video message and an email message.

* * * * *